Patented Dec. 10, 1935

2,023,751

UNITED STATES PATENT OFFICE 2,023,751

AROMATIC ARSONIC ACID

Karl Streitwolf, Frankfort-on-the-Main, Alfred Fehrle, Bad Soden-on-the-Taunus, and Hubert Oesterlin, Frankfort-on-the-Main, Germany, assignors to Winthrop Chemical Company, Inc., New York, N. Y., a corporation of New York No Drawing. Application June 20, 1931, Serial No. 545,844. In Germany July 19, 1930

6 Claims. (Cl. 260—14)

The present invention relates to aromatic arsonic acids and derivatives thereof.

We have found that acyloxyacylaminobenzenearsonic acids of the following general formula

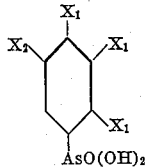

wherein one $x_1$ stands for the group

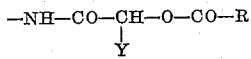

R being the radical of a lower aliphatic or monocyclic aromatic hydrocarbon and Y being hydrogen or methyl one other $X_1$ stands for hydrogen, hydroxy or methyl, the remaining $X_1$ for hydrogen and $X_2$ stands for hydrogen or halogen are obtained by causing an acyloxyacylhalide of the following general formula

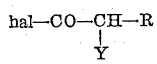

wherein R stands for a univalent radical of an organic acid and Y stands for hydrogen or methyl, to act upon an aminobenzenearsonic acid, the benzene nucleus of which may be further substituted.

The reaction is preferably carried out by dissolving the arsonic acid in an aqueous solution of caustic soda and gradually adding the acyloxyacylhalide to this solution. It has been found to be advantageous to carry out the reaction at a low temperature, for instance at about 0° C. Furthermore it has been found that the addition of the halide is preferably carried out while keeping the alkalinity of the solution during the addition of the halide at the same height which it has before adding the halide.

From the reaction mixture the new compound may be separated by addition of a mineral acid, for instance, of hydrochloric acid.

The new arsonic acids yield with alkalies, ammonia and organic bases, for instance, ethanolamine, piperidine, diethylamine and the like, water-soluble salts.

By partial saponification the therapeutically important hydroxy-acylamino-arylarsenic compounds are obtained by heating the ester derivatives with diluted alkalies.

The following examples serve to illustrate the invention, but they are not intended to limit it thereto.

(1) 21.7 grams of ortho-arsanilic acid are dissolved in 200 cc. of normal caustic soda solution, the solution is cooled to 0° C. and 15 grams of acetylglycollic acid-chloride are added thereto, drop by drop. During the transformation the mixture is kept alkaline by means of about 60 cc. of 2 N caustic soda solution. On addition of hydrochloric acid, the 6-(acetylglycolyl)-amino-benzene-1-arsonic acid separates, which, when recrystallized from water, is obtained in the form of fine needles. The yield amounts to 22 grams. The product is sparingly soluble in water, easily soluble in ethyl alcohol and methyl alcohol. It has the following formula:

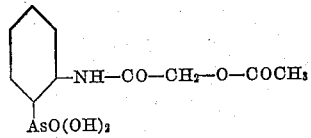

By using instead of the acetylglycollic acid-chloride 18 grams of crotonylglycollic acid-chloride or 22 grams of benzoylglycollic acid-chloride, 23 grams of 6-(crotonylglycolyl)-aminobenzene-1-arsonic acid of the following formula:

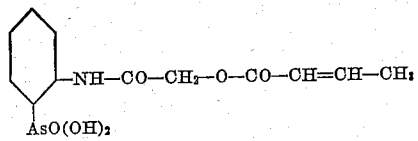

are obtained in the form of prisms which, when recrystallized from water, melt at 168° C. or 25 grams of 6-(benzoylglycolyl)-aminobenzene-1-arsonic acid of the following formula:

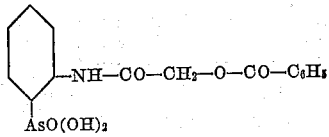

in the form of needles which, when recrystallized from water, melt at 183° C.–185° C.

(2) 25.2 grams of 6-amino-3-chlorobenzene-1-arsonic acid are dissolved as indicated in Example 1 and treated with 15 grams of acetylglycollic acid-chloride. The 6-(acetylglycolyl)-amino-3-chlorobenzene-1-arsonic acid is separated by means of hydrochloric acid. The yield amounts to 26 grams. On recrystallizing the product from water, fine felted needles are obtained melting at 183° C. They are sparingly soluble in water, easily soluble in methyl alcohol and ethyl alcohol and insoluble in acetone. The product has the following formula:

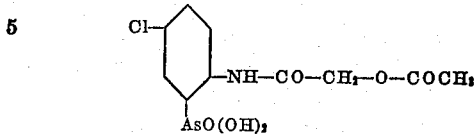

(3) 23.6 grams of 6-amino-4-methylbenzene-1-arsonic acid are dissolved as indicated in Example 1 and acylated with 15 grams of acetylglycollic acid-chloride. On addition of hydrochloric acid the 6-(acetylglycolyl)-amino-4-methylbenzene-1-arsonic acid separates. The yield amounts to 23 grams. On recrystallizing from water needles are obtained which melt at 184° C. The product is difficultly soluble in water, easily soluble in ethyl alcohol and very easily soluble in methyl alcohol. It has the following formula:

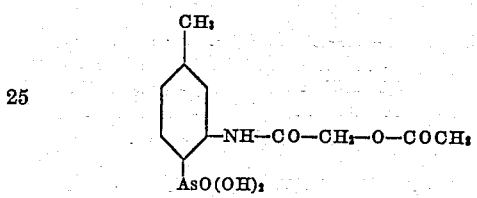

(4) 25.2 grams of 6-amino-4-chlorobenzene-1-arsonic acid are dissolved as indicated in Example 1 and caused to react with 18 grams of crotonylglycollic acid-chloride. On addition of hydrochloric acid 23.2 grams of 6-(crotonylglycolyl)-amino-4-chlorobenzene-1-arsonic acid separate. On recrystallizing from water needles are obtained which melt at 170° C. The product is very sparingly soluble in water, easily soluble in methyl alcohol and ethyl alcohol. It has the following formula:

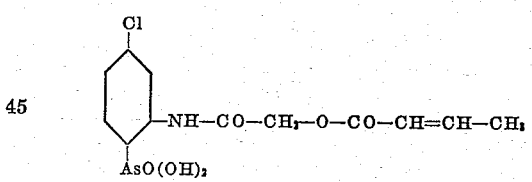

(5) 23.3 grams of 5-amino-4-hydroxybenzene-1-arsonic acid are treated with 15 grams of acetylglycollic acid-chloride in the manner described above. The 5-(acetylglycolyl)-amino-4-hydroxybenzene-1-arsonic acid is recrystallized from water. The yield amounts to 25 grams. Fine needles are obtained which melt at 214° C.-215° C. The product is difficultly soluble in water, easily soluble in ethyl alcohol and methyl alcohol. It has the following formula:

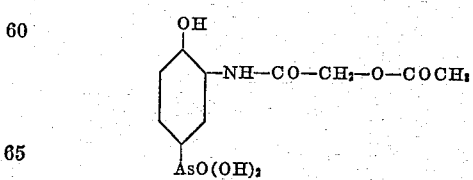

(6) By using in Example 5 instead of acetylglycollic acid-chloride 18 grams of crotonylglycollic acid-chloride, the 5-(crotonylglycolyl)-amino-4-hydroxybenzene-1-arsonic acid is obtained. The yield amounts to 26 grams. On recrystallizing from methyl alcohol and water fine needles are obtained which melt at 229° C. The product is very difficultly soluble in water, easily soluble in methyl alcohol, more difficultly soluble in ethyl alcohol and insoluble in acetone and ether. It has the following formula:

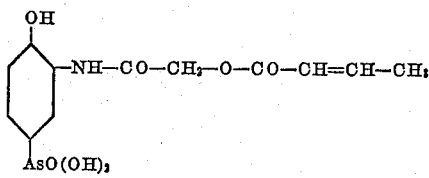

(7) 23.3 grams of 5-hydroxy-4-aminobenzene-1-arsonic acid are dissolved in 200 cc. of normal caustic soda solution and caused to react with 18 grams of crotonylglycollic acid-chloride, while keeping the whole alkaline with about 50 cc. of 2 N caustic soda solution. On addition of hydrochloric acid 26 grams of 4-(crotonylglycolyl)-amino-5-hydroxybenzene-1-arsonic acid are obtained. On recrystallizing from methyl alcohol and water glittering laminæ are obtained melting at 235° C. The product is very difficultly soluble in water, easily soluble in methyl alcohol and ethyl alcohol, insoluble in acetone and ether. It has the following formula:

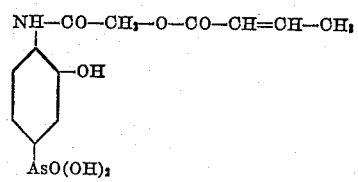

(8) 43 grams of para-arsanilic acid are dissolved in 200 cc. of water and 150 cc. of 2 N-caustic soda solution, the solution is cooled to 0° C. and 32 grams of acetyllactic acid-chloride are added, drop by drop. During the transformation the initial alkalinity is maintained with 120 cc. of 2 N-caustic soda solution. By adding hydrochloric acid until there is an acid reaction to Congo paper, the 4-(acetyllactyl)-aminobenzene-1-arsonic acid separates in the form of fine crystals which are recrystallized from 800 cc. of hot water. The yield amounts to 40 grams. The product is difficultly soluble in water, easily soluble in ethyl alcohol and methyl alcohol. It does not melt below 280° C. The product has the following formula:

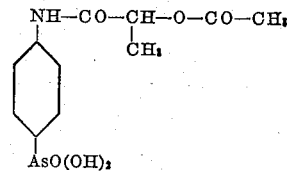

(9) By using in Example 8 instead of the acetyllactic acid-chloride, 40 grams of crotonyllactic acid-chloride boiling at 76° C. under 13 mm. pressure, 45 grams of 4-(crotonyllactyl)-aminobenzene-1-arsonic acid are obtained which are reprecipitated from 800 cc. of 0.5 N sodium acetate solution. The yield amounts to 43 grams. The product is very difficultly soluble in water, easily soluble in ethyl alcohol and very easily soluble in methyl alcohol. It melts at 217° C. It has the following formula:

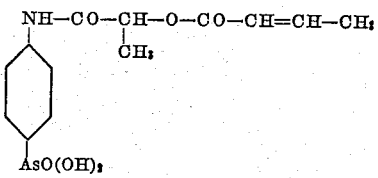

(10) 46 grams of 6-methyl-4-aminobenzene-1-arsonic acid are dissolved in 400 cc. of N-caustic soda solution and the solution is caused to react at 0° C. with 32 grams of acetyllactic acid-chloride. During the transformation the mixture is kept alkaline to turmeric with 120 cc. of 2 N-caustic soda solution. It is cleared with animal charcoal and acidified with hydrochloric acid until there is an acid reaction to Congo paper. The 4-(acetyllactyl)-amino-6-methylbenzene-1-arsonic acid separates in the form of an oil which solidifies after some time and is recrystallized from three times its weight of water. The product is soluble in water, very easily soluble in ethyl alcohol and methyl alcohol, insoluble in acetone. It melts at 170° C.–171° C. It has the following formula:

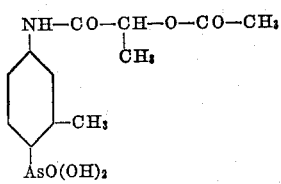

(11) By using in Example 10 instead of the acetyllactic acid chloride, 40 grams of crotonyl-lactic acid-chloride, 40 grams of 4-(crotonyllactyl)-amino-6-methylbenzene-1-arsonic acid are obtained. On recrystallizing from water or alcohol and water crystals are obtained which are difficultly soluble in water, easily soluble in ethyl alcohol and methyl alcohol and melt at 164° C.–166° C. The product has the following formula:

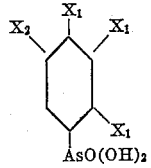

We claim:
1. The compounds of the following general formula:

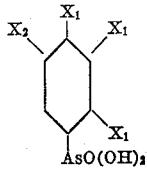

wherein one $X_1$ stands for the group $$-NH-CO-CH-O-CO-R$$
$$\quad\quad\quad\quad\quad |$$
$$\quad\quad\quad\quad\quad y$$

R being the radical of a lower aliphatic or monocyclic aromatic hydrocarbon and $y$ being hydrogen or methyl, one other $X_1$ stands for hydrogen, hydroxy or methyl, the remaining $X_1$ for hydrogen and $X_2$ stands for hydrogen or halogen, said products having therapeutical properties.

2. The compounds of the following general formula:

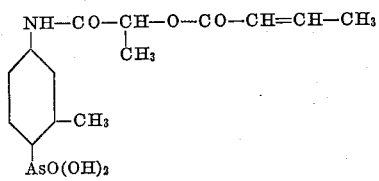

wherein one $X_1$ stands for the group $$-NH-CO-CH-O-CO-R$$
$$\quad\quad\quad\quad\quad |$$
$$\quad\quad\quad\quad\quad CH_3$$

R being the radical of a lower aliphatic or monocyclic aromatic hydrocarbon, one other $X_1$ stands for hydrogen, hydroxy or methyl, the remaining $X_1$ for hydrogen and $X_2$ stands for hydrogen or halogen, said products having therapeutical properties.

3. The compounds of the following general formula:

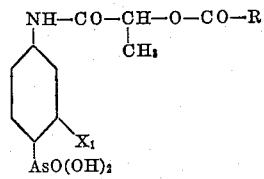

wherein $X_1$ stands for hydrogen or methyl and wherein R stands for the radical of a lower aliphatic or monocyclic aromatic hydrocarbon, said products having therapeutical properties.

4. The compound of the following formula

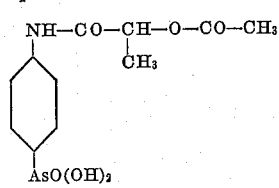

forming fine crystals, difficultly soluble in water, easily soluble in ethyl alcohol and methyl alcohol, recrystallizable from hot water, not melting below 280° C. and having therapeutical properties.

5. The compound of the following formula

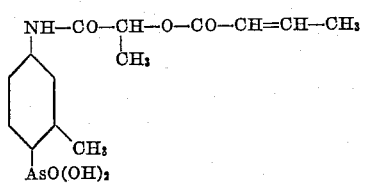

forming crystals, difficultly soluble in water, easily soluble in ethyl alcohol and methyl alcohol, recrystallizable from water or a mixture of alcohol and water, melting at 164° C.–166° C. and having therapeutical properties.

6. The compound of the following formula

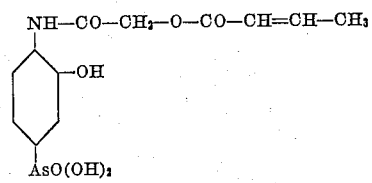

forming glittering laminæ, melting at 235° C., difficultly soluble in water, easily soluble in methyl alcohol and ethyl alcohol, insoluble in acetone and ether and having therapeutical properties.

KARL STREITWOLF.
ALFRED FEHRLE.
HUBERT OESTERLIN.